United States Patent [19]
Puckett

[11] Patent Number: 5,362,017
[45] Date of Patent: Nov. 8, 1994

[54] PARAWING

[75] Inventor: Lawrence J. Puckett, Churchville, Md.

[73] Assignee: The United States of America as represented by the Secretary of the Army, Washington, D.C.

[21] Appl. No.: 156,744

[22] Filed: Nov. 24, 1993

[51] Int. Cl.$^5$ .............................. B64D 17/02
[52] U.S. Cl. ............................ 244/146; 244/145; 244/902; 244/900
[58] Field of Search .......... 244/145, 146, 142, 153 R, 244/902, 900

[56] References Cited

U.S. PATENT DOCUMENTS

| | | | |
|---|---|---|---|
| 3,749,337 | 7/1973 | Jalbert | 244/145 |
| 4,065,079 | 12/1977 | Winchurch | 244/152 |
| 4,424,945 | 1/1984 | Dell | 244/13 |
| 4,811,920 | 3/1989 | Askwith et al. | 244/145 |
| 4,860,970 | 8/1989 | Roselli | 244/16 |
| 4,865,274 | 9/1989 | Fisher | 244/152 |
| 5,172,874 | 12/1992 | Maciocia | 244/142 |
| 5,244,169 | 9/1993 | Brown et al. | 244/146 |

FOREIGN PATENT DOCUMENTS

| | | | |
|---|---|---|---|
| 2633248 | 12/1989 | France | 244/145 |
| 3500120 | 7/1986 | Germany | 244/900 |
| 3805645 | 7/1988 | Germany | 244/145 |
| 345498 | 2/1991 | Japan | 244/902 |

*Primary Examiner*—Michael S. Huppert
*Assistant Examiner*—Anne E. Bidwell
*Attorney, Agent, or Firm*—Freda L. Krosnick; Muzio B. Roberto

[57] ABSTRACT

A self-inflatable parawing comprises an airfoil made of a flexible sheet material and having a plurality of apertures located in the lower, aft surface thereof for admitting inflating air created by the positive air pressure of the air stream flowing over the airfoil. An inflatable support frame is located in the airfoil for providing spanwise stiffness to the airfoil. The support frame is inflated by means of a compressed gas cannister connected through a controllable valve to the support frame.

7 Claims, 2 Drawing Sheets

PARAWING

FIELD OF THE INVENTION

The present invention relates to gliding flexible wing craft known variously in the art as parawings, parafoils, paraplanes and gliding parachutes, and more particularly to a flexible parawing that is self-inflatable.

BACKGROUND OF THE INVENTION

The trend in the design of parafoil wing sections is toward higher lift-to-drag ratios which afford greater glide distances. Self-inflating parafoils are known in which the leading edge of the foil is provided with ram-air induction vents through which air inflates the foil during flight with a positive air pressure.

One such inflatable parafoil is disclosed in U.S. Pat. No. 4,860,970 in which orifices along the leading edge of the foil admit inflating air into a tubular plenum extending across the span of the foil. Air is directed through the tubular plenum toward the tips of the foil and out through apertures in the trailing edge of the foil.

U.S. Pat. No. 4,424,945 discloses a flexible parafoil to which is suspended a rigid wing and frame. The parafoil is divided into several sections which are open at the front or leading edges thereof to collect air in the manner of a ram air scoop. Other forms of ram air-inflated gliding parachutes are disclosed in U.S. Pat. Nos. 4,065,079 and 4,865,274.

While the foregoing conventional parafoil designs advantageously provide a positive air pressure for self-inflation of the parafoil wing section, there is a significant drawback to these designs. The ram air openings or orifices on the leading edge of the parafoils substantially increase the drag coefficient of the foil. Consequently, the lift-to-drag ratio of the foil is reduced thereby offsetting to some extent the advantage of a greater glide distance for a wing section with a high lift-to-drag ratio.

It would be desirable therefore to provide a self-inflating parawing design that increases drag only minimally, if at all, and still maintains a high lift-to-drag ratio. It would also be desirable to increase the span-to-chord ratio of the parawing to further increase its lift-to-drag ratio.

SUMMARY OF THE INVENTION

The present invention is directed to a self-inflatable flexible parawing which is characterized by a high lift-to-drag ratio and which is inflatable in a manner to minimize any increase in drag coefficient resulting from the self-inflation structure of the parawing. In particular, the positive pressure on the lower aft section of the foil adjacent the trailing edge of the foil is used to inflate the parawing through apertures in the parawing at that location. Unlike the conventional ram air self-inflatable parafoils, the location of the inflation apertures at the lower, aft section of the foil is not in a critical high lift section of the foil thereby eliminating disturbances to the air flow at the leading edge of the foil. In addition, the boundary layer is thicker at the rearward location of the inflation apertures and the air flow has less velocity thereby further reducing drag.

In a first embodiment of the invention, the parawing is made up of a plurality of interconnected plenums each having a relatively thick airfoil shape in cross-section and in air flow communication with one another via passages in flexible partitions or ribs disposed between and separating the plenums. A plurality of shrouds are connected to the perimeter of the parawing for suspending the load beneath the parawing. This parawing is preferably used to support relatively light loads, such as might be encountered in supporting parachutist personnel or light cargo.

A second embodiment of the parawing of the invention comprises a self-inflatable airfoil with an elongated span and a flexible inflatable internal support frame. The support frame includes a plurality of hollow inflatable tubes extending across the span of the parawing from wingtip to wingtip. A compressed gas source under remote control or under the control of a parawing user or operator is used to inflate the hollow tubes of the support frame to produce a wing with greater stiffness. The higher stiffness wing of the second embodiment enables parawings of greater wingspan thereby providing a wing with a high aspect ratio and a greater lift-to-drag ratio. In addition, the increased stiffness of the wing allows the load to be supported on a rigid support much closer to the underside of the wing in a more streamlined arrangement without long shrouds extending from the parawing perimeter.

With the foregoing and other objects, advantages and features of the invention that will become hereinafter apparent, the nature of the invention may be more clearly understood by reference to the following detailed description of the invention, the appended claims and to the several views illustrated in the drawings.

DETAILED DESCRIPTION OF THE INVENTION

Figure 1:
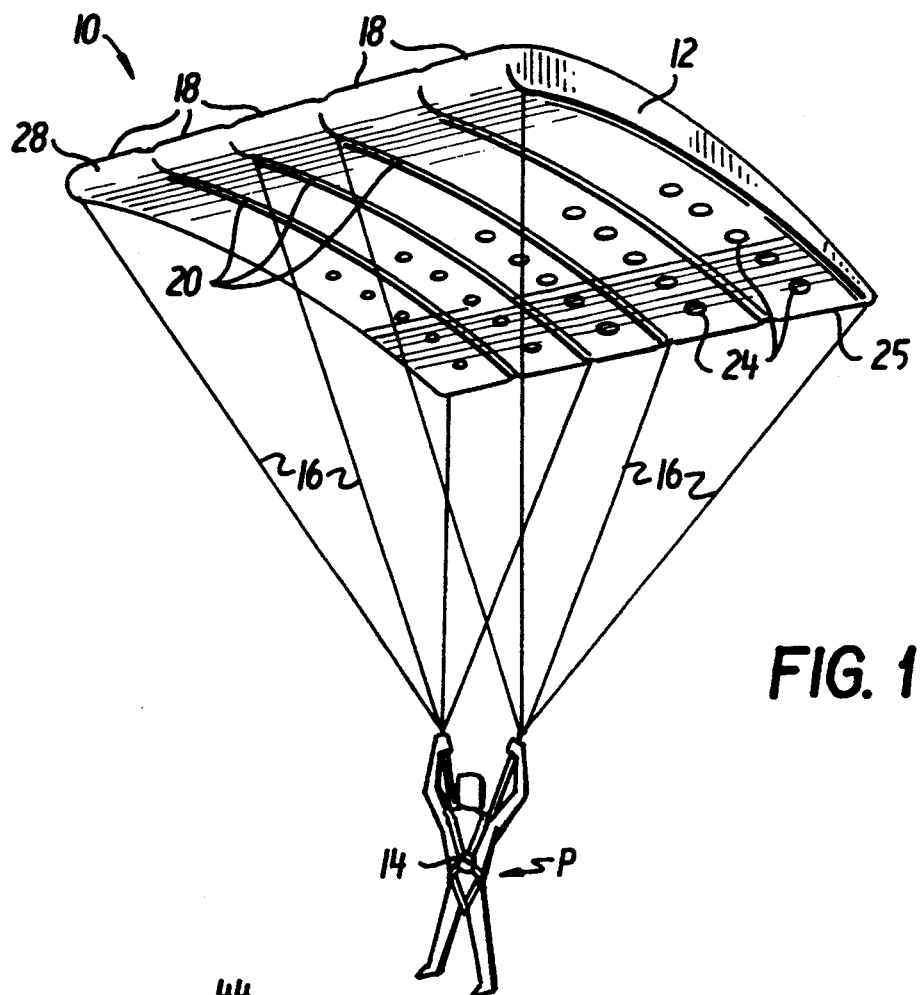
FIG. 1 is a perspective view of a first embodiment of the invention illustrating the use of the parawing of the invention to support an individual parachutist from a plurality of shrouds.
Figure 2:
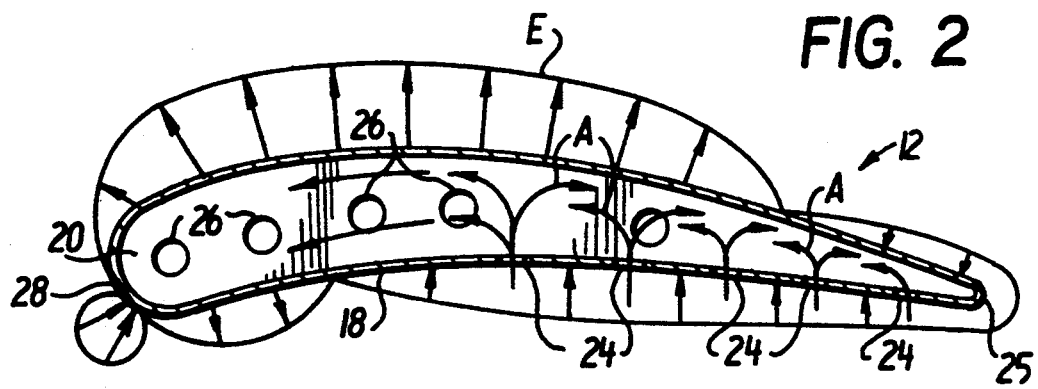
FIG. 2 is a cross-section of the parawing of FIG. 1 illustrating the pressure profile over the foil and the manner of self-inflation of the parawing.

Referring now in detail to the drawings, there is illustrated in FIGS. 1 and 2 a first embodiment of the parawing of the invention designated generally by reference numeral 10. Parawing 10 comprises an airfoil or wing 12 formed of a flexible sheet, such as a woven fabric or polymeric sheet material. In this embodiment the wing 12 is employed as a canopy for supporting an individual parachutist P from the wing 12 by means of a harness 14 and a plurality of shrouds 16 secured about the perimeter of the wing 12.

The wing 12 has a relatively thick cross-section between the upper and lower surfaces thereof and may be fabricated from a plurality of individual airfoil segments 18 sewn or otherwise affixed together across the span of the wing. Alternatively, the surfaces of the wing 12 may be formed from upper and lower sheets with flexible chordal ribs or dividers 20 (FIG. 2) disposed at seams 22 between the wing segments 18. Other equivalent constructions of the wing 12 will be apparent to those skilled in the art to which this invention pertains.

A plurality of apertures 24 are formed in the sheet material of each segment 18 on the lower, aft portions thereof adjacent the trailing edge 25 of the wing 12. Referring to FIG. 2, the pressure profile of the airstream around the wing is shown by the pressure envelope E with pressure vectors indicated by the arrows representing the magnitude and direction of pressure relative to the wing. As can be seen, the apertures 24 are positioned on the wing at the lower, aft location (the lower trailing half of the wing) where a positive pressure exists. The positive air pressure at this location serves to inflate the internal spaces of each airfoil segment 18 as indicated by the arrows A. The chordal ribs or dividers 20 are preferably formed of the same flexible sheet material as the wing segments 18 and function to maintain the airfoil shape of the wing 12. Openings 26 may be provided in the dividers 20 to permit inflation air to equalize between the inflated plenums of each wing segment 18. Advantageously, the faired leading edge 28 of the wing 12 is not subject to the high drag characteristics of the conventional ram air self-inflating parafoils described above.

Figure 3:
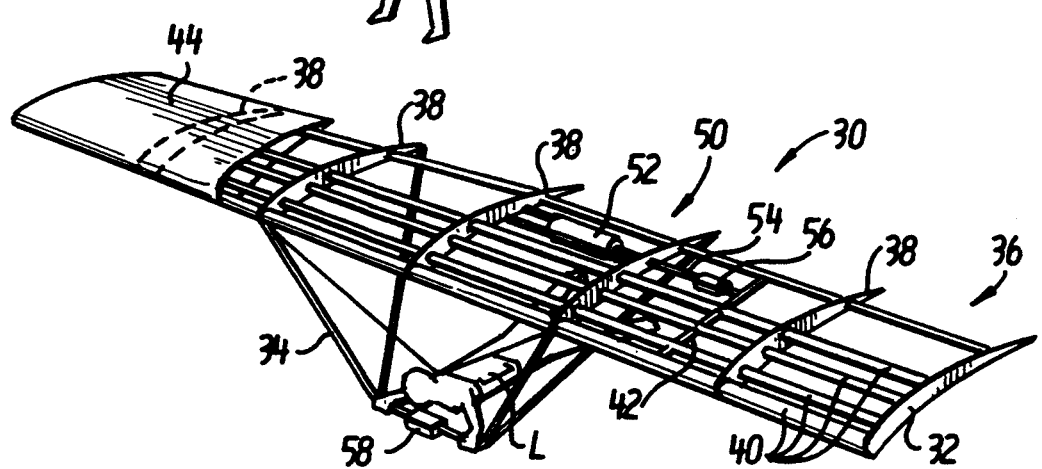
FIG. 3 is a perspective view of a second embodiment of the invention illustrating the inflatable support frame pressurized with a compressed gas into its stiff configuration.
Figure 4:
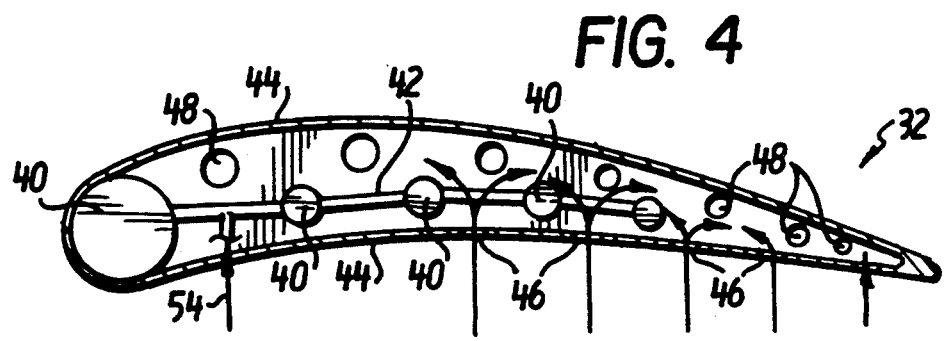
FIG. 4 is a cross-section of the parawing of FIG. 3 illustrating the manner of self-inflation of the parawing and of inflating the support frames.
Figure 5:
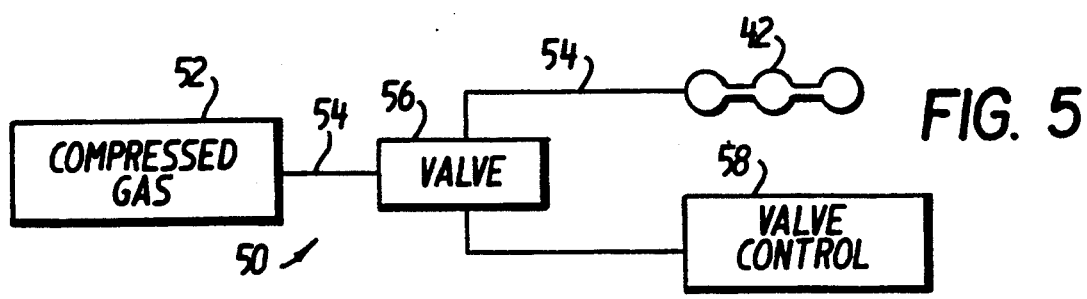
FIG. 5 is a schematic diagram of the support frame inflation system of the invention.

Now referring to FIGS. 3–5, a second embodiment of the parawing of the invention is shown and is designated generally by reference numeral 30. The parawing 30 of the second embodiment is characterized by a larger span-to-chord ratio, i.e., a higher aspect ratio, and comprises an inflatable airfoil or wing 32 having a relatively thick cross-section between the upper and lower surfaces thereof. A load supporting member 34 formed of a rigid structure is mounted centrally beneath the wing 32. In this embodiment, the load L is depicted as an individual, but may include other cargo or loads supported from the member 34 in lieu of or in addition to the individual L.

The wing 32 is constructed with a flexible, inflatable support frame 36 comprising a plurality of chordal ribs or dividers 38 through which a plurality of hollow tubular struts 40 extend across the span of the wing 32. Tubular struts 40 are closed at the ends thereof and are in flow communication with one another through one or more manifolds 42 (only one shown). The support frame 36 is covered by a flexible sheet material which forms the upper and lower skin 44 of the wing 32. The skin 44 and the components 38, 40 of the support frame 36 may be fabricated of a woven fabric or polymeric sheet material. Preferably, the tubular struts 40 are made of a relatively air impervious material, such as a plastic or elastomeric material, so as to minimize air leakage from the struts.

The plenum formed by the skin 44 of the wing 32 is self-inflatable by means of apertures 46 (FIG. 4) formed in the lower, aft section of the wing 32 in the same manner as described above in connection with the first embodiment of the invention. Openings 48 may be provided in the flexible dividers 38 to equalize the inflation pressure across the span of the wing 32.

A support frame inflation system 50 (FIGS. 3 and 5) is mounted in the airfoil plenum of the wing 32 and comprises a compressed gas cannister 52 suspended between a pair of adjacent dividers 38 and connected to the manifold 42 via a hose 54 and valve 56. Valve 56 is operative to admit pressurized gas from cannister 52 into the manifold 42 to inflate the support frame 36 and provide spanwise stiffness to the wing 32. The valve 56 is opened and closed by a valve control 58 operable either by the individual operator L or remotely, for example, by a radio link. It is also contemplated that the entire inflation system 50 may be mounted to the supporting member 34 and connected to manifold 42 by a hose.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. In a parawing comprising an inflatable airfoil formed of a flexible sheet material defining a plenum, said airfoil having upper and lower surfaces and leading and trailing edges, a plurality of apertures formed in the lower surface of said airfoil and communicating with said plenum for inflating the same by air flowing over said airfoil, a plurality of flexible chordal ribs spaced across the span of said airfoil and extending between the upper and lower surfaces thereof, an inflatable support frame disposed in said plenum for increasing the stiffness of said airfoil across the span thereof, and means for inflating said support frame, the improvement thereof comprising the positioning of the apertures adjacent the trailing edge of the lower surface of the airfoil in the area of positive air pressure.

2. The parawing of claim 1, wherein said inflating means comprises a source of compressed gas and means for controlling the admission of compressed gas into said tubular members.

3. The parawing of claim 1, including a manifold connected to said tubular members, said control means comprising a flow line communicating said compressed gas source with said manifold, a valve in said flow line and a valve controller for opening and closing said valve.

4. The parawing of claim 1, including apertures disposed in the lower trailing half of said airfoil through which said airfoil is inflated by the air pressure created by the airstream flowing over said airfoil.

5. The parawing of claim 1, wherein said inflating means comprises a source of compressed gas and means for controlling the admission of compressed gas into said inflatable support frame.

6. The parawing of claim 1, wherein said means for inflating said support frame comprises a source of compressed gas and means for controlling admission of compressed gas to said support frame.

7. The parawing of claim 1, including means connected to said airfoil for supporting a load therefrom.

* * * * *